United States Patent [19]

Hirose et al.

[11] Patent Number: 5,576,057
[45] Date of Patent: Nov. 19, 1996

[54] METHOD OF PRODUCING HIGH PERMEABLE COMPOSITE REVERSE OSMOSIS MEMBRANE

[75] Inventors: Masahiko Hirose; Kenichi Ikeda, both of Osaka, Japan

[73] Assignee: Nitto Denko Corporation, Osaka, Japan

[21] Appl. No.: 362,930

[22] Filed: Dec. 23, 1994

[30] Foreign Application Priority Data

Jun. 24, 1993 [JP] Japan ..................... 5-153331

[51] Int. Cl.$^6$ .............. B05D 5/00; B01D 69/00
[52] U.S. Cl. .............. 427/245; 96/14; 210/490; 210/500.38; 210/506
[58] Field of Search ............... 96/14; 210/490, 210/500.38, 506; 264/41; 427/245

[56] References Cited

U.S. PATENT DOCUMENTS

| | | | |
|---|---|---|---|
| 4,661,254 | 4/1987 | Zupancic et al. | 210/500.39 |
| 4,792,404 | 12/1988 | Swedo et al. | 210/490 |
| 4,872,984 | 10/1989 | Tomaschke | 210/500.38 |
| 4,950,404 | 8/1990 | Chau | 210/500.37 |

OTHER PUBLICATIONS

Encyclopedia of Polymer Science and Engineering, vol. 8, pp. 228–229, ©1987.
CRC Handbook of Chemistry and Physics, 59th ed., 1978–1979, pp. C–87; 260,333,459,730,731,732 and E–21.
Condensation Polymers: By Interfacial and Solution Methods, P. 103, Paul Morgan, ©1965.
Paul W. Morgan, J. Macromol. Sci.–Chem., A15(5), pp. 683–699 (1981), *Comments on the Status and Future of Interfacial Polycondensation.*

*Primary Examiner*—Robert A. Dawson
*Assistant Examiner*—Kenneth M. Jones
*Attorney, Agent, or Firm*—Sughrue, Mion, Zinn, Macpeak & Seas

[57] ABSTRACT

A method of producing a high permeable composite reverse osmosis membrane which comprises forming a polyamide type skin layer on a porous support by the process comprising a step of coating a solution A containing a compound having at least two reactive amino groups on the porous support and a step of contacting a solution B containing a polyfunctional acid halide with the coated layer of the solution A, wherein the difference between a solubility parameter of the solution A and a solubility parameter of the solution B is from 7 to 15 $(cal/cm^3)^{1/2}$.

9 Claims, No Drawings

1

METHOD OF PRODUCING HIGH PERMEABLE COMPOSITE REVERSE OSMOSIS MEMBRANE

FIELD OF THE INVENTION

The present invention relates to a method of producing a composite reverse osmosis membrane for selectively separating the components of a liquid mixture, and more specifically to a method of producing a composite reverse osmosis membrane having a high salt rejection and a high permeability comprising a porous support having formed thereon a thin film comprising a polyamide as the main component.

Such a composite osmosis membrane is suitable for the production of ultra-pure water, desalting of brine, etc., and also can contribute to make a closed system of a waste liquid or waste water by removing contaminating sources and recovering effective materials from a contaminated liquid or water, which causes environmental pollution, such as a dyeing waste liquid, an electrodeposition coating waste liquid, etc.

BACKGROUND OF THE INVENTION

Hitherto, a composite reverse osmosis membrane comprising a porous support having formed thereon a thin film having a substantially selective separability is known as a reverse osmosis membrane having a different structure from an asymmetric osmosis membrane.

At present, many composite reverse osmosis membranes each having formed on a support a thin film comprising a polyamide obtained by an interfacial polymerization of a polyfunctional aromatic amine and a polyfunctional aromatic acid halide are known as disclosed in, e.g., JP-A-55-147106 (corresponding to U.S. Pat. No. 4,277,344), JP-A-62-121603 (corresponding to U.S. Pat. No. 4,761,234) and, JP-A-63-218208 (the term "JP-A" as used herein means an "unexamined published Japanese patent application"). Further, a composite reverse osmosis membrane having formed on a support a thin film comprising a polyamide obtained by an interfacial polymerization of a polyfunctional aromatic amine and a polyfunctional alicyclic acid halide is known as disclosed in, e.g., JP-A-61-42308 (corresponding to U.S. Pat. No. 5,254,261).

The composite reverse osmosis membranes described above have a high desalting performance and a high water permeability, but it has further been desired for those membranes to improve the water permeability while keeping the high desalting performance from the point of efficiency, etc. For these requirements, various kinds of additives are proposed as described in, e.g., JP-A-2-187135 (corresponding to U.S. Pat. No. 4,872,984). However, in the conventional composite reverse osmosis membranes, the improvement of the water permeability is still insufficient even where these additives are used, and a composite reverse osmosis membrane having a higher water permeability has been desired.

SUMMARY OF THE INVENTION

Accordingly, an object of the present invention is to provide a composite reverse osmosis membrane having both a high salt rejection and a high water permeability.

According to the present invention, there is provided a method of producing a high permeable composite reverse osmosis membrane which comprises forming a polyamide type skin layer on a porous support by the means including the step of coating a solution A containing a compound having at least two reactive amino groups on the porous support and the step of contacting a solution B containing a polyfunctional acid halide with the coated layer of the solution A, wherein the difference between the solubility parameter of the solution A and the solubility parameter of the solution B is from 7 to 15 $(cal/cm^3)^{1/2}$.

DETAILED DESCRIPTION OF THE INVENTION

The present invention is described in detail below.

The term "solubility parameter" used herein means the amount defined by $(\Delta H/V)^{1/2}$ $(cal/cm^3)^{1/2}$ when a molar evaporation heat of a liquid is $\Delta H$ cal/mol and a molar volume is V $cm^3$/mol.

Further, in the present invention, the expression "the difference between the solubility parameter of the solution A and the solubility parameter of the solution B" means that the solubility parameter of the solution A is larger than the solubility parameter of solution B.

In the present invention, the difference between the solubility parameter of the solution A containing the amino group-containing compound and the solubility parameter of the solution B containing the polyfunctional acid halide is from 7 to 15 $(cal/cm^3)^{1/2}$, and preferably from 8 to 14.5 $(cal/cm^3)^{1/2}$. If the difference in such solubility parameters is less than 7 $(cal/cm^3)^{1/2}$, the thin film is difficult to form well at the interface between the solution A and the solution B, while if the difference is over 15 $(cal/cm^3)^{1/2}$, the interfacial film is formed well but the water permeability is decreased, whereby the object of the present invention cannot be attained.

In the present invention, there is no particular restriction on the solvents for the solution A and the solution B if the solution A and solution B each containing the solvent meet the specific difference of the solubility parameters described above.

Examples of the solvent for the solution A which is preferably used in the present invention are a mixed solvent of water and an alcohol such as ethanol, propanol, butanol, butyl alcohol, 1-pentanol, 2-pentanol, t-amyl alcohol, isoamyl alcohol, isobutyl alcohol, isopropyl alcohol, undecanol, 2-ethylbutanol, 2-ethylhexanol, octanol, cyclohexanol, tetrahydrofurfuryl alcohol, neopentyl glycol, t-butanol, benzyl alcohol, 4-methyl-2-pentanol, 3-methyl-2-butanol, pentyl alcohol, allyl alcohol, ethylene glycol, diehylene glycol, triethylene glycol, tetraethylene glycol, propanediol, butanediol, pentanediol, hexanediol, glycerol, etc,; a mixed solvent of water and a nitrogen compound such as nitromethane, formamide, methylformamide, acetonirile, dimethylformamide, ethylformamide, etc; and a mixed solvent of a solvent having the solubility parameter of at least 10 $(cal/cm^3)^{1/2}$ by itself and water.

In this case, there is no particular restriction on the mixing ratio, of water and other solvent in the solution A if the difference between the solubility parameter of the solution A and that of the solution B described below is in the specific range defined above. For example, the mixing ratio of water/ethanol can be selected in the range of (50 to 90)/(50 to 10), and preferably (60 to 90)/(40 to 10) (by weight ratio).

In the present invention, the solubility parameter of the solution A is usually from 17 to 23 $(cal/cm^3)^{1/2}$, and is preferably from 19 to 23 $(cal/cm^3)^{1/2}$.

Examples of the solvent for the solvent B which is preferably used in the present invention are water-immiscible organic solvents, and in particular, are hydrocarbons such as hexane, heptane, octane, nonane, cyclohexane, etc,; and halogenated hydrocarbons such as carbon tetrachloride, trichlorotrifluoroethane, diflorotetrachloroethane, hexachloroethane, etc.

In the present invention, the solubility parameter of the solution B is usually from 5 to 9.5 $(cal/cm^3)^{1/2}$, and preferably from 5 to 9 $(cal/cm^3)^{1/2}$.

The amine component contained in the solution A used in the present invention is not particularly limited if the amine component is a polyfunctional amine having at least two reactive amino groups. Examples thereof are aromatic, aliphatic and alicyclic polyfunctional amines.

Examples of the aromatic polyfunctional amine are m-phenylenediamine, p-phenylenediamine, 1,3,5-triaminobenzene, 1,2,4-triaminobenzene, 3,5-diaminobenozic acid, 2,4-diaminotoluene, 2,4-diaminoanisol, amidol, and xylylenediamine.

Examples of the aliphatic polyfunctional amine are ethylenediamine, propylenediamine, and tris(2-aminoethyl)amine.

Examples of the alicyclic polyfunctional amine are 1,3-diaminocyclohexane, 1,2-diaminocyclohexane, 1,4-diaminocyclohexane, piperazine, 2,5-dimethylpiperazine, and 4-aminomethylpiperazine.

Those amines can be used alone or as mixtures thereof.

The polyfunctional acid halide contained in the solution B used in the present invention is not particularly limited, and the examples thereof are aromatic, aliphatic and alicyclic polyfunctional acid halides.

Examples of the aromatic polyfunctional acid halide are trimesic acid chloride, terephthalic acid chloride, isophthalic acid chloride, biphenyldicarboxylic acid chloride, and naphthalenedicarboxylic acid dichloride.

Examples of the aliphatic polyfunctional acid halide are propanetricarboxylic acid chloride, butanetricarboxylic acid chloride, pentanetricarboxylic acid chloride, glutaryl halide, and adipoyl halide.

Examples of the alicyclic polyfunctional acid halide are cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic chloride, and tetrahydrofurandicarboxylic acid chloride.

In the present invention, a composite reverse osmosis membrane having formed a thin film comprising a crosslinked polyamide as the main component on a porous support is obtained by interfacial polymerization of the above-described amine component and the above-described acid halide component.

The porous support for supporting the thin film described above is not particularly limited if the support can support the thin film, and examples thereof are polysulfone, polyaryl ether sulfones such as polyether sulfone, etc.; polyimide, and polyvinylidene fluoride. In particular, from the point of being chemically, mechanically and thermally stable, a porous support comprising a polysulfone or a polyaryl ether sulfone is preferably used. Such a porous support usually has a thickness of from about 25 to 125 µm, and preferably from about 40 to 75 µm, although the thickness thereof is not always limited to those ranges.

In more detail, the composite reverse osmosis membrane can be obtained by forming a first layer comprising the solution A containing the amine component on the porous support, forming a second layer comprising the solution B containing the acid halide component on the first layer, and then carrying out the interfacial polycondensation to form a thin film comprising a crosslinked polyamide on the porous support.

The solution A containing the polyfuctional amine can contain a small amount of a polymer such as polyvinyl alcohol, polyvinyl pyrrolidone, polyacrylic acid, etc., and/or a polyhydric alcohol such as sorbitol, glycerol, etc., to facilitate the film formation and improve the performance of the composite reverse osmosis membrane.

The amine salts described in JP-A-2-187135 (corresponding to U.S. Pat. No. 4,872,984), such as a salt of a tetraalkylammonium halide or a trialkylamine and an organic acid can also be suitably used for the solution A to facilitate the film formation, improve the absorption of the amine solution in the support, and accelerate the condensation reaction.

The solution A can further contain a surfactant such as sodium dodecylbenzenesulfonate, sodium dodecylsulfate, sodium laurylsulfate, etc. Such a surfactant has an effect for improving the wettability of the solution A containing the polyfunctional amine for the porous support. Furthermore, for accelerating the polycondensation reaction on the interface, it is effective to use sodium hydroxide or sodium tertiary phosphate capable of removing a hydrogen halide formed by the interfacial reaction or to use an acylation catalyst, etc., as a catalyst.

The concentration of the acid halide and the concentration of the polyfunctional amine are not particularly limited in the solution B containing the acid halide and also the solution A containing the polyfunctional amine described above, but the concentration of the acid halide is usually from 0.01 to 5% by weight, and preferably from 0.05 to 1% by weight, and the concentration of the polyfunctional amine is usually from 0.1 to 10% by weight, and preferably from 0.5 to 5% by weight.

The solution A containing the polyfunctional amine is coated on the porous support, the solution B containing the polyfunctional acid halide compound is coated thereon, each excess solution is removed, and the coated layers are then dried by heating to a temperature of usually from about 20° C. to 150° C., and preferably from about 70° C. to 130° C., for from about 1 minute to 10 minutes, and preferably from about 2 minutes to 8 minutes, thereby forming a water-permeable thin film comprising a crosslinked polyamide. The thickness of the thin film is in the range of from about 0.05 µm to 1 µm, and preferably from about 0.15 µm to 0.5 µm.

Further, in the production method of the composite reverse osmosis membrane of the present invention, the salt rejection performance can be more improved by applying thereto a chlorine treatment with hypochlorous acid, etc., as described in JP-B-63-36803 (the term "JP-B" as used herein means an "examined published Japanese patent application").

The production method of the present invention can provide a composite reverse osmosis membrane having a high salt rejection and a high permeability and capable of desalting for practical use under a relatively low pressure, and the composite reverse osmosis membrane can be suitably used for the desalination of brine, sea water, etc., and the production of ultra-pure water which is required for the production of semiconductors.

The present invention is described in more detail by reference to the following examples and comparative examples, but it should be understood that the invention is not construed as being limited thereto.

EXAMPLE 1

A mixed liquid of water and ethanol (the solubility parameter was 21.3 $(cal/cm^3)^{1/2}$ and the mixing ratio of water/ethanol was 80/20 by weight ratio) containing 2.0% by weight of m-phenylenediamine, 0.25% by weight of sodium laurylsulfate, 2.0% by weight of triethylamine, and 4.0% by weight of camphor sulfonic acid was prepared as a solution A. The solution A was contacted with a porous polysulfone support membrane and the excess solution A was removed to form a layer of the solution A on the support membrane.

A hexane solution (the solubility parameter was 7.3 $(cal/cm^3)^{1/2}$) containing 0.10% by weight of trimesic acid chloride and 0.10% by weight of isophthalic acid chloride was contacted with the surface of the support membrane obtained above as a solution B. The support membrane was then kept in a hot air dryer at 120° C. for 5 minutes to form a polymer thin film on the support membrane, thereby obtaining a composite reverse osmosis membrane.

The difference between the solubility parameter of the solution A and the solubility parameter of the solution B was 14.0 $(cal/cm^3)^{1/2}$.

When the performance of the composite reverse osmosis membrane thus obtained was evaluated using an aqueous solution containing 1500 ppm of sodium chloride having pH of 6.5 at a pressure of 15 $kg/cm^2$, the salt rejection by the electric conductivity of the permeated liquid was 99.5% and the permeation flux was 1.0 $m^3/m^2 \cdot day$.

EXAMPLES 2 AND 3, AND COMPARATIVE EXAMPLES 1 AND 2

By following the same procedure as in Example 1 except that the mixing ratio of water and ethanol of the amine solution (solution A) was changed as shown in Table 1 below, composite reverse osmosis membranes were obtained.

The results obtained are shown in Table 1 below.

TABLE 1

|  | Amine Solution A | | | Solubility parameter of solution B $(cal/cm^3)^{1/2}$ | Difference in solubility parameter between solution A and solution B $(cal/cm^3)^{1/2}$ | 1500 ppm NaCl Aqueous Solution | |
|---|---|---|---|---|---|---|---|
|  | Water (wt %) | Ethanol (wt %) | Solubility parameter $cal/cm^3)^{1/2}$ |  |  | salt rejection (%) | Permeation flux $(m^3/m^3 \cdot day)$ |
| Example 1 | 80 | 20 | 21.3 | 7.3 | 14.0 | 99.5 | 1.0 |
| Example 2 | 90 | 10 | 22.3 | 7.3 | 15.0 | 99.6 | 0.7 |
| Example 3 | 70 | 30 | 20.2 | 7.3 | 12.9 | 99.4 | 0.9 |
| Comparative Example 1 | 100 | 0 | 23.4 | 7.3 | 16.1 | 99.6 | 0.6 |
| Comparative Example 2 | 0 | 100 | 12.7 | 7.3 | 5.4 | 10 | 41 |

EXAMPLES 4 TO 6

By following the same procedure as in Example 1 except that isopropyl alcohol, t-butyl alcohol, or nitromethane was used in place of ethanol of the amine solution (solution A), composite reverse osmosis membranes were obtained. The results obtained are shown in Table 2 below.

TABLE 2

|  | Amine Solution A | | | Solubility parameter of solution B $(cal/cm^3)^{1/2}$ | Difference in solubility parameter between solution A and solution B $(cal/cm^3)^{1/2}$ | 1500 ppm NaCl Aqueous Solution | |
|---|---|---|---|---|---|---|---|
|  | Water (wt %) | Mixed Solvent (wt %) | Solubility parameter $cal/cm^3)^{1/2}$ |  |  | salt rejection (%) | Permeation flux $(m^3/m^3 \cdot day)$ |
| Example 4 | 80 | Isopropyl alcohol 20 | 21.0 | 7.3 | 13.7 | 99.5 | 1.0 |
| Example 5 | 80 | t-Butyl alcohol 20 | 20.8 | 7.3 | 13.5 | 99.6 | 1.0 |
| Example 6 | 85 | Nitromethane 15 | 21.8 | 7.3 | 14.5 | 99.5 | 0.8 |

From the results shown above, it can be seen that the composite reverse osmosis membranes obtained by the method of the present invention have both a high salt rejection and a high water permeability as compared with the conventional membranes.

While the invention has been described in detail and with reference to specific embodiments thereof, it will be apparent to one skilled in the art that various changes and modifications can be made therein without departing from the spirit and scope thereof.

What is claimed is:

1. A method of producing a high permeable composite reverse osmosis membrane which comprises forming a polyamide layer on a porous support by a process comprising the steps of:
   (i) coating a solution A onto the porous support, wherein the solution A comprises a compound having at least two reactive amino groups and a solvent, wherein the solvent comprises a mixture of water and an alcohol in a mixing ratio of from 50/50 to 90/10 by weight, and
   (ii) coating a solution B containing a polyfunctional acid halide onto the coating of the solution A, wherein the solution A has a solubility parameter of from 17 to 23 $(cal/cm^3)^{1/2}$, and wherein the difference between the solubility parameter of the solution A and the solubility parameter of the solution B is from 7 to 15 $(cal/cm^3)^{1/2}$.

2. The method as claimed in claim 1, wherein the solution B comprises a solvent comprising a water-immiscible organic solvent.

3. The method as claimed in claim 1, wherein the solubility parameter of solution A is from 19 to 23 $(cal/cm^3)^{1/2}$.

4. The method as claimed in claim 1, wherein the solubility parameter of solution B is from 5 to 9.5 $(cal/cm^3)^{1/2}$.

5. The method as claimed in claim 4, wherein the solubility parameter of the solution B is from 5 to 9 $(cal/cm^3)^{1/2}$.

6. The method as claimed in claim 1, wherein the difference between the solubility parameter of the solution A and the solubility parameter of the solution B is from 8 to 14.5 $(cal/cm^3)^{1/2}$.

7. The method as claimed in claim 1, wherein said solvent has a water/alcohol mixing ratio of 60/40 to 90/10 by weight.

8. The method as claimed in claim 1, wherein the compound having at least two reactive amino groups is m-phenylenediamine.

9. The method as claimed in claim 1, wherein the alcohol is isopropyl alcohol.

* * * * *